United States Patent
Babson

[15] 3,698,561
[45] Oct. 17, 1972

[54] FILTERING PIPETTE
[72] Inventor: Arthur L. Babson, Chester, N.J.
[73] Assignee: Warner-Lambert Company, Morris Plains, N.J.
[22] Filed: May 12, 1971
[21] Appl. No.: 142,711

[52] U.S. Cl..................................210/445, 128/232
[51] Int. Cl. ..............................................B01d 35/28
[58] Field of Search ....23/254, 259; 73/425.4, 425.6; 128/220, 231–233; 141/22–24; 210/406, 416, 436, 445–451

[56] References Cited

UNITED STATES PATENTS

| | | |
|---|---|---|
| 3,141,336 | 7/1964 | Oates....................73/425.4 P |
| 3,276,847 | 10/1966 | Duff et al...................128/233 |
| 2,774,628 | 12/1956 | Engstrum...............210/445 X |
| 3,449,081 | 6/1969 | Hughes.................73/425.6 X |

Primary Examiner—Reuben Friedman
Assistant Examiner—R. W. Burks
Attorney—Albert H. Graddis, Frank S. Chow, Neil D. Edwards, Edward G. Comrie and Anne M. Kelly

[57] ABSTRACT

Pipette of resilient material is made of two interlocking parts which taper down at their opposite ends to a narrow opening. A filter disc of a suitable material is held in position between the interlocking parts. Liquid which is drawn into the pipette through one end passes through the filter disc before being discharged in filtered form at the other end.

3 Claims, 4 Drawing Figures

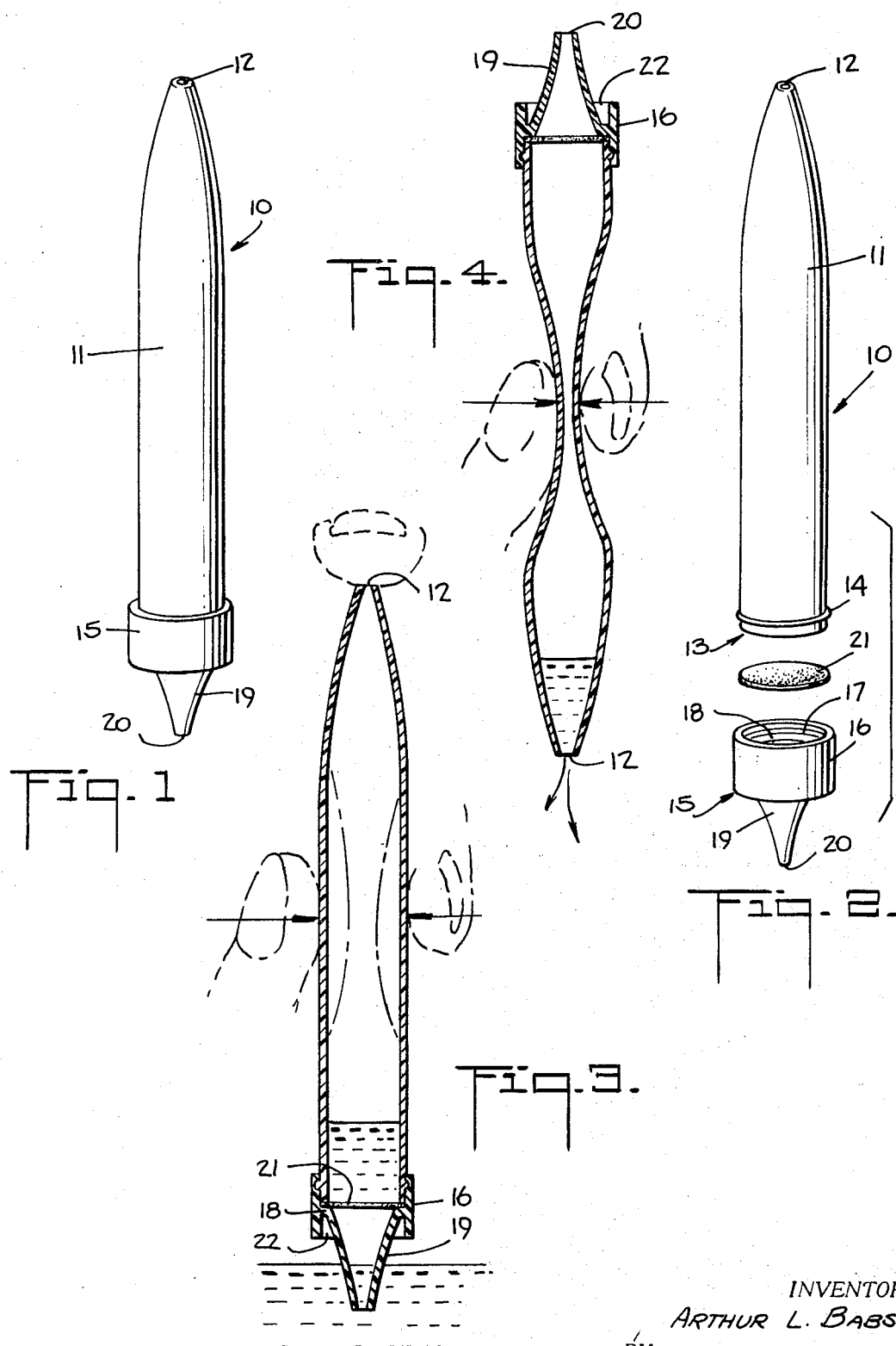

FILTERING PIPETTE

SUMMARY OF THE INVENTION

This invention relates to a filtering pipette for use in filtering and dispensing liquids such as body fluids which are normally handled in relatively small quantities during various diagnostic test procedures in the clinical laboratory. By employing resilient filtering pipettes of the present invention, laboratory technicians are enabled to filter and dispense controlled amounts of these body fluids as required for one or more manual diagnostic test procedures. Since these resilient filtering pipettes may be molded conveniently of relatively inexpensive synthetic plastic materials they may be disposed of after a single use if desired. The filter disc material may be filter paper of the usual type, for example, or may be formed of woven glass fibers or any other suitable material to yield the desired filtering properties and efficiency desired.

In the drawing:

FIG. 1 is a view in perspective showing the several elements forming the filtering pipette of this invention in final assembled position for use;

FIG. 2 is an exploded perspective view of the filtering pipette showing the structural relation of the several elements which are assembled together to form said filtering pipette;

FIG. 3 is a side-elevational view, in section, of the filtering pipette being held in upright position and showing one end of the filtering pipette immersed in liquid in normal use; and FIG. 4 is a side-elevational view, in section, of the filtering pipette being held in an upright position but reversed 180° from FIG. 3 illustrating how the filtered liquid entering at one end may be controllably discharged from the opposite end of the filtering pipette.

Like numerals indicate like parts throughout the several views of the drawing.

Referring now to the drawing and more particularly to FIG. 1, the assembled filtering pipette of this invention is generally indicated by reference numeral 10. Pipette 10 is formed of two separable sections as shown in FIG. 2. The sections forming pipette 10 comprise an upper and generally cylindrical section 11 which is tapered to terminate at its upper end in a narrow opening 12 and at the lower end in a wide cylindrical opening 13. The outer surface of section 11 is provided with a raised bead 14 as clearly shown in FIG. 2. The lower section of pipette 10 comprises a cap 15 which is formed of an outer cylindrical wall 16 whose inner cylindrical surface is provided with a groove 17. Just below groove 17 and spaced slightly apart is a circular shoulder 18 which is formed inside cap 15 where the tapered conical wall 19 inside said cap 15 joins wall 16 at about the center of the inner surface of said wall, as more particularly shown in FIG. 3. Tapered conical wall 19 narrows down and at its apex forms an opening 20 through which liquid may be sucked into the pipette. A filter disc 21 is placed between upper section 11 and cap 15 and is normally held in position between these parts when they are in assembled position as shown in FIGS. 3 and 4.

When the parts are brought together, bead 14 snaps into groove 17 and disc 21 is held in fixed position by the edge of cylindrical opening 13 as it bears on shoulder 18. Thus, when the several parts shown in FIG. 2 are brought together they produce the assembled pipette shown in FIG. 1.

In order to use the filtering pipette of this invention the index finger seals off opening 12 as shown in FIG. 3 and the resilient side walls are then squeezed between the thumb and second finger of one hand to expel the air within the pipette. Lower opening 20 is then dipped below the surface of the liquid to be tested and the finger pressure on the resilient sides of the pipette is released. The suction created by the expanding side walls acts to draw liquid up through opening 20 and into the pipette. In doing so the liquid passes through filter disc 21 and the filter liquid then enters the main body of the pipette as shown in FIG. 3.

To discharge the filtered liquid the pipette is inverted as shown in FIG. 4 and, by applying pressure to the resilient sides of section 11 of the pipette, the desired number of drops of liquid are then discharged through opening 12. Any drops of unfiltered liquid which may have remained on the outer surface of tapered wall 19 when the pipette is inverted are prevented from running down and reaching the hand of the technician since they are caught in the annular space 22 formed between wall 16 and tapered wall 19 as shown in FIG. 4 where the pipette is shown in its upright position.

Since the filtering pipette of this invention can be conveniently molded of any resilient plastic material such as, for example, polyethylene, polypropylene, nylon polymer or a cellulose ester such as cellulose acetate, cellulose propionate, cellulose butyrate and the like, it may be readily cleaned for reuse. Since these materials are relatively inexpensive these pipettes may also be employed economically as a single use, disposable item in the clinical laboratory.

I claim:

1. A filtering pipette comprising a first section consisting of a resilient cylindrical body, said body being tapered at one end to form a narrow opening, a second section comprising a generally cylindrical cap tapered at one end to form a narrow opening, adapted at its other end to be separably attached to said tapered cylindrical body at its opposite end, seating means formed between said sections when attached, a filter disc mounted in said seat and held in position by the cooperative action of the separable sections the resilience of said cylindrical body being sufficient that liquid may be drawn thereinto through the submerged cap opening and said filter disc by the vacuum created as the cylindrical body returns to its original shape after being collapsed by finger pressure and thereafter the resulting filtered liquid may be discharged through the narrow opening in said cylindrical body when it is inverted and again collapsed by finger pressure.

2. A filtering pipette in accordance with claim 1 wherein the two sections are separably attached by the cooperative action of a circumferential bead and an annular groove provided in said sections.

3. A filtering pipette in accordance with claim 1 wherein a portion of said generally cylindrical cap tapers down to form a narrow opening and another portion of said cap comprises a wall surrounding said narrow opening and forming an annular space between said wall and said narrow opening.

* * * * *